United States Patent [19]

Blattner

[11] Patent Number: 4,692,278

[45] Date of Patent: Sep. 8, 1987

[54] PROCESS FOR THE PREPARATION OF 1,4-DIAMINOANTHRAQUINONES

[75] Inventor: Rudolf Blattner, Rheinfelden, Fed. Rep. of Germany

[73] Assignee: Ciba-Geigy Corporation, Ardsley, N.Y.

[21] Appl. No.: 844,410

[22] Filed: Mar. 26, 1986

[30] Foreign Application Priority Data

Apr. 1, 1985 [CH] Switzerland .......................... 1399/85

[51] Int. Cl.[4] .............................................. C07C 97/24
[52] U.S. Cl. ..................................... 260/367; 260/378
[58] Field of Search ................................. 260/378, 367

[56] References Cited

U.S. PATENT DOCUMENTS

| | | | |
|---|---|---|---|
| 1,776,869 | 9/1930 | Tatum | 260/378 |
| 2,207,045 | 7/1940 | Wilder | 260/378 |
| 3,040,063 | 6/1962 | Walker | 260/367 |
| 3,984,425 | 10/1976 | Mori et al. | 260/378 |

*Primary Examiner*—Glennon H. Hollrah
*Assistant Examiner*—Raymond Covington
*Attorney, Agent, or Firm*—Kevin T. Mansfield

[57] ABSTRACT

The invention relates to an improvement of the process for the preparation of 1,4-diaminoanthraquinones by oxidation of the corresponding 2,3-dihydro-1,4-diaminoanthraquinones with nitrobenzene, which improvement is brought about by carrying out the reaction under reduced pressure.

19 Claims, No Drawings

PROCESS FOR THE PREPARATION OF 1,4-DIAMINOANTHRAQUINONES

The present invention relates to a process for the preparation of 1,4-diaminoanthraquinones by oxidation of the corresponding 2,3-dihydro-1,4-diaminoanthraquinones.

1,4-Diaminoanthraquinones are usually prepared by heating the corresponding 2,3-dihydro-1,4-diaminoanthraquinones ("leuko-1,4-diaminoanthraquinones") with nitrobenzene, in the presence of small amounts of an organic base, e.g. piperidine, in the temperature range from 130° to 160° C. However, this reaction affords the desired 1,4-diaminoanthraquinone only in relatively bad yield since considerable amounts of 1-amino-4-hydroxyanthraquinone and 1-amino-4-anilinoanthraquinone are formed.

These disadvantages can be reduced only to an insufficient degree by continuously passing a gentle stream of an inert gas, e.g. nitrogen, through the reaction mass during the reaction.

It is the object of the present invention to provide a process in which the aformementioned problems either do not occur or only occur to a less degree.

This object is achieved by the process of the present invention by carrying out the reaction at a temperature in the range from 100° to 200° C. under reduced pressure, under which a portion of the nitrobenzene distills off. Surprisingly, the 1,4-diaminoanthraquinones are thereby obtained in higher yield, and the by-products 1-amino-4-hydroxyanthraquinone and 1-amino-4-anilinoanthraquinone are formed in smaller quantities than in the customary processes. The resultant 1,4-diaminoanthraquinones are either used as such as dyes or they are used as intermediates for the preparation of dyes, e.g. vat dyes. On account of the greater purity of the 1,4-diaminoanthraquinone, said dyes possess improved dyeing properties, e.g. there is less staining of polyester fibres.

Accordingly, the present invention relates to a process for the preparation of 1,4-diaminoanthraquinones of formula (1)

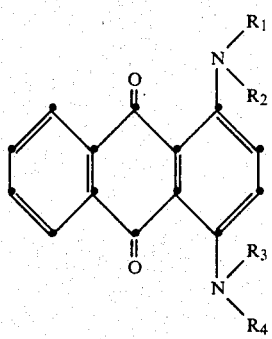
(1)

wherein each of $R_1$, $R_2$, $R_3$ and $R_4$ independently of one another is hydrogen, alkyl or aryl, by oxidation of a 2,3-dihydro-1,4-diaminoanthraquinone of formula (2)

(2)

wherein $R_1$, $R_2$, $R_3$ and $R_4$ are as defined above, with nitrobenzene, which process comprises carrying out the reaction at a temperature in the range from 100° to 200° C. under a pressure which is the same as or lower than the vapour pressure of the nitrobenzene at the temperature applied.

Each of the radicals $R_1$, $R_2$, $R_3$ and $R_4$ independently of one another is hydrogen or alkyl, in particular $C_1C_{12}$alkyl, e.g. methyl, ethyl, n-butyl, isobutyl and n-dodecyl. Throughout this specification, the term alkyl shall also comprise substituted alkyl, e.g. 2-phenylethyl, 2-hydroxyethyl, 5-cyanopentyl, 2-sulfoethyl or 3-dimethylaminopropyl. $R_1$, $R_2$, $R_3$ and $R_4$ may also be unsubstituted or substituted aryl, e.g. phenyl or naphthyl, 4-methylphenyl, 4-phenoxyphenyl, 4-biphenylyl, 2,4,6-trimethylphenyl or 4-acetylaminophenyl.

Each of $R_1$, $R_2$, $R_3$ and $R_4$ independently of one another is preferably hydrogen, $C_1$-$C_4$alkyl, phenyl or phenyl substituted by $C_1$-$C_4$alkyl, phenoxy, $C_1$-$C_4$alkylcarbonyl or phenyl.

In the process of the present invention, it is preferred to employ those compounds of formula (2) wherein $$-N\begin{matrix}R_1\\R_2\end{matrix} \quad \text{and} \quad -N\begin{matrix}R_3\\R_4\end{matrix}$$

are identical and, among such compounds, in particular those which are derived from primary amines, i.e. those in which $R_1$ and $R_3$ are hydrogen.

The process of the present invention is particularly suitable for the preparation of compounds of formula (1), wherein each of $R_1$, $R_2$, $R_3$ and $R_4$ is hydrogen.

The process of the present invention is carried out for example as follows:

A compound of formula (2) is dissolved or suspended in three to four times the amount by weight of nitrobenzene. Subsequently, preferably catalytic amounts of an organic base, in particular piperidine, collidine or di-n-butylamine, as well as of an inorganic basic compound, in particular sodium carbonate, potassium carbonate, sodium bicarbonate or potassiuam bicarbonate, are added.

The amounts of organic base and of inorganic basic compound correspond to the amounts which are usually employed in the oxidation of compounds of formula (2) with nitrobenzene.

The reaction mixture is then heated to a temperature in the range from 100° to 200° C. It is favourable to select a pressure of <100 mbar when heating commences and then to raise the pressure gradually as the temperature increases. After reaching the reaction temperature, which is preferably in the range from 130° to 160° C., the pressure is then adjusted such that the reaction mixture boils and a portion of the nitrobenzene distills off. The pressure is therefore the same as or lower than the vapour pressure of the nitrobenzene at the temperature applied.

Water and aniline distill off together with the nitrobenzene. It is preferred to distill off 3 to 30 moles, in particular 5 to 15 moles, of nitrobenzene per mole of compound of formula (2) during the reaction.

The duration of the reaction is dependent on the reaction conditions, e.g. the temperature. The reaction is preferably carried out for 2 to 5 hours in the temperature range from 145° to 160° C., in particular from 150° to 155° C.

The resultant 1,4-diaminoanthraquinone can be isolated in the conventional manner, e.g. by removing the nitrobenzene by steam distillation, then filtering the reaction mixture and drying the filtration residue.

The 1,4-diaminoanthraquinones obtained by this process are used as dyes or they can be used as starting materials for further reactions, e.g. for the preparation of further intermediates of the anthraquinone series such as sulfonated or benzoylated 1,4-diaminoanthraquinones, as well as for the preparation of anthrimides and vat dyes.

A preferred variant of the process of the present invention comprises subsequently condensing the resultant 1,4-diaminoanthraquinone, without isolating it, with an aromatic, preferably anthraquinoid, halogen compound to give the anthrimide, in which process variant the halogen compound and the resultant suspension of the 1,4-diaminoanthraquinone are heated very rapidly to the reaction temperature, i.e. within less than 10 minutes, preferably within less than 1 minute, most preferably within not more than 10 seconds. It is preferred to proceed by adding the halogen compound to the suspension of the 1,4-diaminoanthraquinone and then adding this mixture to nitrobenzene which has been heated to the reaction temperature for the anthrimide formation.

This variant can of course only be carried out with those 1,4-diaminoanthraquinones which contain at least one primary or secondary amino group.

The reaction temperature for the anthrimide formation is preferably in the range from 180° to 220° C., most preferably from 195° to 215° C. The educts, namely the 1,4-diaminoanthraquinone and the aromatic halogen compound, may be added through separate feed-lines to the nitrobenzene which has been heated to the reaction temperature. It is, however, preferred to add the aromatic halogen compound to the resultant suspension of the 1,4-diaminoanthraquinone and then to add the resultant mixture to the heated nitrobenzene.

The condensation reaction is carried out in the presence of a base and copper catalyst. The copper catalyst and the base may be present in that portion of the nitrobenzenene which has been heated to the reaction temperature or they can be added together with the educts.

Preferably, 5 to 30% by weight of these components (copper catalyst and base) are in the solvent which has been heated to the reaction temperature and the remainder is added together with the educts. A suitably larger amount of the base may be added during the synthesis of the 1,4-diaminoanthraquinone so that said base is contained in the resultant reaction mass.

Suitable aromatic halogen compounds are those in which the halogen atom is attached direct to the aromatic nucleus. Acid halides of aromatic compounds, or compounds which behave similarly to acid halides, e.g. cyanuric chloride, shall not be understood as being aromatic halogen compounds.

Particularly suitable aromatic halogen compounds of this type are halogenated anthraquinone, benzanthrone, anthanthrone, pyranthrone, dibenzanthrone, phthaloylacridone, flavanthrone, dibenzpyrenequinone or isoviolanthrone, which compounds may be further substituted by customary substituents of vat dyes.

Especially good results are obtained in the process of the present invention by using chlorinated or brominated anthraquinone, benzanthrone, anthanthrone, pyranthrone or dibenzanthrone, which compounds may be further substituted by benzoylamino.

The halogen compound and the vattable compound are generally employed in approximately stoichiometric amounts. However, an excess of e.g. 10% of one of the components is also possible.

Suitable copper catalyst are metallic copper and copper compounds such as copper oxide or copper(I) chloride, with copper being preferred and copper(I) chloride being most preferred.

Suitable bases are e.g. sodium bicarbonate, potassium bicarbonate, sodium acetate, potassium acetate, sodium carbonate and potassium carbonate as well as mixtures of these compounds.

The amount of copper catalyst required in this variant is in general in the range from 0.1 to 1% by weight, based on the resultant anthrimide.

After the condensation reaction, the anthraquinone imides are isolated in conventional manner, e.g. by removing the solvent by steam distillation and then filtering off the condensation product and drying it.

The resultant anthraquinone imides are mostly dye intermediates. After conversion to carbazole or acridine derivatives they yield vat dyes which are used for dyeing and printing textile materials such as cotton.

The invention is illustrated by the following non-limitative Examples. Percentages are by weight.

EXAMPLE 1

60 g of 2,3-dihydro-1,4-diaminoanthraquinone (content 92%, containing 1.5% of 1,4-diaminoanthraquinone), 10 g of sodium carbonate (soda) and 0.4 ml of piperidine are added to 350 ml of nitrobenzene. A vacuum of about 230 mbar is then applied, and the batch is subsequently heated to 150° C., during which time the vaccuum is adjusted such that the boiling temperature of the reaction mass can be maintained in the range from 150° to 155° C. During the heating phase, any water present is distilled off. The temperature is maintained in the range from 150° to 155° C. for 3 hours and the heating capacity is regulated such that during this time 170 to 200 ml of nitrobenzene, containing water and aniline, distill off. 170 ml of nitrobenzene are subsequently added and, under the same conditions, a further 170 ml of nitrobenzene are distilled off for 2 more hours. The nitrobenzene is then removed from the reaction mass by steam distillation. Yield after filtration and drying: 59.5 g of a violet powder containing 91% of 1,4-diaminoanthraquinone, 0.4% of 1-amino-4-hydroxyanthraquinone and 0.3% of 1-amino-4-anilinoanthraquinone.

COMPARATIVE EXAMPLES (a) If the procedure as described in Example 1 is repeated exactly, except that the reaction is carried out under normal pressure, after the same working up the yield is 59.5 g of a violet powder containing 82% of 1,4-diaminoanthraquinone, 7.5% of 1-amino-4-hydroxyanthraquinone and 2.1% of 1-amino-4-anilinoanthraquinone.

(b) If the procedure as described in Example 1 is repeated exactly, except that the reaction is carried under normal pressure and nitrogen is passed through the reaction mass, after the same working up the yield is 59.5 g of a violet powder containing 87% of 1,4-diaminoanthraquinone, 4% of 1-amino-4-hydroxyanthraquinone and 1% of 1-amino-4-anilinoanthraquinone.

EXAMPLE 2

The procedure described in Example 1 is repeated. However, the solution of 1,4-diaminoanthraquinone obtained on completion of the reaction is further used direct, without isolating the anthraquinone, for the preparation of trianthrimide. To this end, 116 g of 99% 1-chloroanthraquinone, 50 g of soda, 1.5 g of copper(I) chloride and 320 ml of nitrobenzene are added to the reaction mass, which has a volume of about 180 ml and contains 54.1 g of 1,4-diaminoanthraquinone.

Over 1.5 hours, the resultant suspension is added to a boiling suspension of 50 ml of nitrobenzene, 10 g of soda and 0.5 g of copper chloride in such a manner that the boiling temperature (210° to 215° C.; slight distillation) can be maintained continuously. After a reaction time of a further 2.5 hours at this temperature, the reaction is complete and the reaction mass can be worked up in conventional manner (steam distillation, filtration and drying in vacuo in a venuleth). After drying, the filter cake may be suspended in water in order to remove the salts, subsequent to which the suspension is filtered.

Yield: 225 g of trianthrimide (salt-containing) or 170 g after salt removal and drying.

EXAMPLE 3

The procedure described in Example 1 is repeated, except that the batch is heated to 165° C. and the vacuum is adjusted to about 305 mbar. After a reaction time of 1.5 hours and a distillation time of 1 hour, the yield is 59.5 g of a product which contains 89% of 1,4-diaminoanthraquinone, 1.1% of 1-amino-4-hydroxyanthraquinone and 1.4% of 1-amino-4-anilinoanthraquinone.

EXAMPLE 4

The procedure described in Example 1 is repeated except that the reaction temperature is 140° C. and the vacuum is adjusted to about 130 mbar. After a reaction time of 5 hours and a distillation time of 3 hours, the yield is 59.5 g of a violet powder, the quality of which is the same as that of the product of Example 1.

EXAMPLE 5

The procedure described in Example 1 is repeated, except that the total amount of 520 ml of nitrobenzene is added at the beginning, and, during the reaction time of 4 hours, 340 ml of nitrobenzene are distilled off at a temperature in the range from 150° to 155° C. and under a pressure of about 230 mbar. A further addition of nitrobenzene and subsequent renewed distillation are dispensed with. In accordance with Example 2, the reaction mass thus obtained can be employed direct for the preparation of further intermediates of the anthraquinone series.

If the reaction mass is worked up, the yield is 59.5 g of a violet powder, the quality of which is the same as that of the product of Example 1.

What is claimed is:

1. In a process for the preparation of a 1,4-diaminoanthraquinone of formula (1)

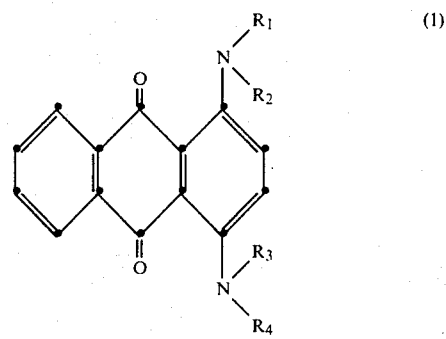

wherein each of $R_1$, $R_2$, $R_3$ and $R_4$ independently of one another is hydrogen, $C_1$–$C_{12}$-alkyl which is unsubstituted or substituted by phenyl, hydroxy, cyano, sulfo or dialkylamino, naphthyl, or phenyl which is unsubstituted or substituted by $C_1$–$C_4$-alkyl, phenoxy, $C_1$–$C_4$-alkylcarbonyl or phenyl, by oxidation of a 2,3-dihydro-1,4-diaminoanthraquinone of formula (2)

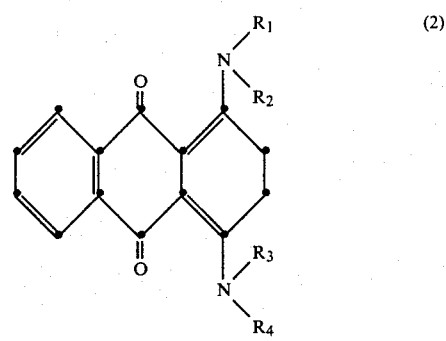

wherein $R_1$, $R_2$, $R_3$ and $R_4$ are as defined above, with nitrobenzene, at elevated temperature, in the presence of an organic base and/or an inorganic base, wherein the improvement comprises carrying out the reaction at a temperature in the range from 100° to 200° C. at reduced pressure while simultaneously distilling off 3 to 20 moles of nitrobenzene per mole of compound of formula (2).

2. A process according to claim 1, wherein a part of the nitrobenzene is added during the distillation.

3. A process according to claim 1, which comprises starting from a compound of formula (2), wherein each of $R_1$, $R_2$, $R_3$ and $R_4$ independently of one another is hydrogen, $C_1$–$C_4$alkyl, phenoxy, $C_1$–$C_4$alkylcarbonyl or phenyl.

4. A process according to claim 1, which comprises starting from a compound of formula (2), wherein

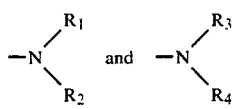

are identical

5. A process according to claim 1, which comprises starting from a compound of formula (2), wherein $R_1$ and $R_3$ are hydrogen.

6. A process according to claim 4, which comprises starting from a compound of formula (2), wherein each of $R_1$, $R_2$, $R_3$ and $R_4$ is hydrogen.

7. A process according to claim 1, which comprises carrying out the reaction at a temperature in the range from 130° to 160° C.

8. A process according to claim 1, which comprises distilling off 5 to 15 moles of nitrobenzene per mole of compound of formula (2).

9. A process according to claim 1, which comprises carrying out the reaction for 2 to 5 hours in the temperature range from 145° to 160° C.

10. A process according to claim 9, wherein the reaction is carried out in the temperature range from 150° to 155° C.

11. A process according to claim 1, wherein the organic base is piperidine, collidine or di-n-butylamine.

12. A process according to claim 1, wherein the inorganic basic compound is sodium carbonate, potassium carbonate, sodium bicarbonate or potasssium bicarbonate.

13. A process for the preparation of an anthraquinone imide, which process comprises oxidizing a 2,3-dihydro-1,4-diamino-anthraquinone of formula (2)

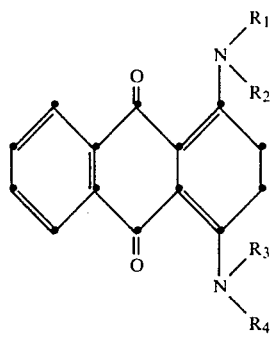

wherein $R_1$ is hydrogen and each of $R_2$, $R_3$ and $R_4$ independently of one another is hydrogen, $C_1-C_{12}$-alkyl which is unsubstituted or substituted by phenyl, hydroxy, cyano, sulfo or dialkylamino, naphthyl, or phenyl which is unsubstituted or substituted by $C_1-C_4$-alkyl, phenoxy, $C_1-C_4$-alkylcarbonyl or phenyl, with nitrobenzene, said reaction being carried out at a temperature in the range from 100° to 200° C. at reduced pressure while simultaneously distilling off 3 to 20 moles of nitrobenzene per mole of compound of the formula (2), and subsequently condensing the resultant 1,4-diaminoanthraquinone, without isolating it, with an aromatic halogen compound in the presence of a base and a copper catalyst to give the anthrimide, the condensation being effected by heating the halogen compound and the resultant suspension of the 1,4-diaminoanthraquinone very rapidly to the reaction temperature.

14. A process according to claim 13, wherein the condensation reaction temperature is in the range from 180° to 220° C.

15. A process according to claim 14, wherein the reaction temperature is in the range from 195° to 215° C.

16. A process according to claim 13, which comprises adding the aromatic halogen compound to the resultant suspension of the 1,4-diaminoanthraquinone and then adding the resultant mixture to nitrobenzene which has been heated to the reaction temperature for the anthrimide formation.

17. A process according to claim 16, wherein 5 to 30% by weight of the base and the copper catalyst are in the nitrobenzene which has been heated to the reaction temperature and the remainder is added together with the educts.

18. A process according to claim 13, wherein the halogen compound is a halogenated anthraquinone, benzanthrone, anthanthrone, pyranthrone, dibenzanthrone, phthaloylacridone, flavanthrone, dibenzpyrenequinone or isoviolanthrone, which compounds may be further substituted by customary substituents of vat dyes.

19. A process according to claim 18 which comprises the use of chlorinated or brominated anthraquinone, benzanthraquinone, anthanthrone, pyranthrone or dibenzanthrone, which compounds are unsubstituted or further substituted by benzoylamino.

* * * * *